United States Patent
Kim et al.

(10) Patent No.: US 10,331,268 B2
(45) Date of Patent: Jun. 25, 2019

(54) METHOD FOR CALIBRATING SENSITIVITY OF TOUCH INPUT DEVICES SENSING TOUCH PRESSURE, AND COMPUTER READABLE RECORDING MEDIUM

(71) Applicant: HiDeep Inc., Gyeonggi-do (KR)

(72) Inventors: Tae Hoon Kim, Gyeonggi-do (KR); Sang Sic Yoon, Gyeonggi-do (KR); Se Yeob Kim, Gyeonggi-do (KR); Bon Kee Kim, Gyeonggi-do (KR); Ho Jun Moon, Gyeonggi-do (KR); Seon Dong Kwak, Gyeonggi-do (KR)

(73) Assignee: HiDeep Inc. (KR)

( * ) Notice: Subject to any disclaimer, the term of this patent is extended or adjusted under 35 U.S.C. 154(b) by 0 days.

(21) Appl. No.: 15/562,666

(22) PCT Filed: May 25, 2016

(86) PCT No.: PCT/KR2016/005505
§ 371 (c)(1),
(2) Date: Sep. 28, 2017

(87) PCT Pub. No.: WO2016/195309
PCT Pub. Date: Dec. 8, 2016

(65) Prior Publication Data
US 2018/0088732 A1 Mar. 29, 2018

(30) Foreign Application Priority Data
Jun. 1, 2015 (KR) .......................... 10-2015-0077042

(51) Int. Cl.
*G06F 3/044* (2006.01)
*G06F 3/041* (2006.01)

(52) U.S. Cl.
CPC ............ *G06F 3/0418* (2013.01); *G06F 3/044* (2013.01); *G06F 3/0414* (2013.01); *G06F 2203/04105* (2013.01)

(58) Field of Classification Search
CPC ................................. G06F 3/0414; G06F 3/44
See application file for complete search history.

(56) References Cited

U.S. PATENT DOCUMENTS

| | | | |
|---|---|---|---|
| 2011/0084932 A1* | 4/2011 | Simmons | G06F 3/0414 345/174 |
| 2012/0105358 A1* | 5/2012 | Momeyer | G06F 3/0414 345/174 |

(Continued)

FOREIGN PATENT DOCUMENTS

| | | |
|---|---|---|
| JP | 2010191574 | 2/2010 |
| JP | 2012103995 | 5/2012 |

(Continued)

OTHER PUBLICATIONS

Corresponding Office Action issued by the KIPO dated May 3, 2016.

(Continued)

*Primary Examiner* — Hang Lin
(74) *Attorney, Agent, or Firm* — The Belles Group, P.C.

(57) ABSTRACT

A sensitivity compensation method of a touch input device sensing a touch pressure may be provided. The sensitivity compensation method includes: detecting a capacitance change amount by applying a pressure to a plurality of points defined on a touch sensor panel; generating a raw data for the capacitance change amount of the defined point; generating a decimal value data for each of the sets by dividing a data value within the set by a maximum value within the set; calculating an average value of each defined point; generating a representative value data by calculating a value corresponding to all the points of the touch sensor panel;

(Continued)

calculating a balance factor on the basis of the representative value data; and compensating for a touch pressure sensitivity of the touch input device by using the balance factor.

17 Claims, 9 Drawing Sheets

(56) References Cited

U.S. PATENT DOCUMENTS

| | | | | |
|---|---|---|---|---|
| 2013/0342501 A1* | 12/2013 | Molne | ................... | G06F 3/0414 |
| | | | | 345/174 |
| 2015/0049064 A1* | 2/2015 | Shin | ..................... | G06F 3/0418 |
| | | | | 345/178 |

FOREIGN PATENT DOCUMENTS

| | | |
|---|---|---|
| JP | 2013097628 | 5/2013 |
| JP | 2014110013 | 6/2014 |
| KR | 1020110026960 | 3/2011 |
| KR | 1020150020774 | 2/2015 |

OTHER PUBLICATIONS

Corresponding Office Action issued by the KIPO dated Aug. 7, 2017.
Corresponding International Search Report and Written Opinion for PCT/KR2016/005505 dated Sep. 12, 2016. WO.

* cited by examiner

FIG 4.

| set | set1 | set2 | set3 | set4 | set5 | set6 | set7 | set8 | set9 | set10 |
|---|---|---|---|---|---|---|---|---|---|---|
| p1 | 0.318563 | 0.180599 | 0.394349 | 0.330223 | 0.376043 | 0.476332 | 0.420168 | 0.289934 | 0.245533 | 0.163525 |
| p2 | 0.452096 | 0.324132 | 0.44656 | 0.385611 | 0.475376 | 0.641858 | 0.512605 | 0.351115 | 0.346974 | 0.18543 |
| p3 | 0.507186 | 0.242114 | 0.417076 | 0.458459 | 0.463272 | 0.671331 | 0.552221 | 0.409283 | 0.299712 | 0.204789 |
| p4 | 0.47485 | 0.303628 | 0.404791 | 0.505719 | 0.440735 | 0.650491 | 0.506603 | 0.474081 | 0.274928 | 0.208355 |
| p5 | 0.405389 | 0.265773 | 0.366708 | 0.482541 | 0.393155 | 0.590354 | 0.392557 | 0.460518 | 0.267435 | 0.225675 |
| p6 | 0.467665 | 0.310726 | 0.468673 | 0.360927 | 0.515025 | 0.678178 | 0.554622 | 0.386076 | 0.34121 | 0.242486 |
| p7 | 0.594012 | 0.414826 | 0.506757 | 0.43528 | 0.575543 | 0.821375 | 0.698679 | 0.45871 | 0.408069 | 0.255222 |
| p8 | 0.665868 | 0.419558 | 0.503686 | 0.504214 | 0.546745 | 0.846681 | 0.760504 | 0.533454 | 0.341787 | 0.258278 |
| p9 | 0.582635 | 0.455047 | 0.456388 | 0.589103 | 0.498748 | 0.812742 | 0.763505 | 0.56962 | 0.349856 | 0.314315 |
| p10 | 0.581437 | 0.439274 | 0.474201 | 0.600241 | 0.469115 | 0.747544 | 0.702281 | 0.586498 | 0.351009 | 0.298523 |
| p11 | 0.552096 | 0.438486 | 0.509214 | 0.373269 | 0.53005 | 0.795773 | 0.64886 | 0.46745 | 0.384438 | 0.313296 |
| p12 | 0.644311 | 0.514984 | 0.546069 | 0.471102 | 0.629382 | 0.939565 | 0.831333 | 0.610307 | 0.406916 | 0.32705 |
| p13 | 0.7 | 0.532334 | 0.554668 | 0.568332 | 0.586394 | 0.927062 | 0.87455 | 0.675708 | 0.367723 | 0.300051 |
| p14 | 0.683234 | 0.47082 | 0.535012 | 0.666466 | 0.538397 | 0.894909 | 0.891957 | 0.707957 | 0.360231 | 0.349465 |
| p15 | 0.669461 | 0.557571 | 0.532555 | 0.666466 | 0.510434 | 0.8312 | 0.85114 | 0.676612 | 0.370605 | 0.375955 |
| p16 | 0.58503 | 0.522871 | 0.554054 | 0.454545 | 0.616027 | 0.835665 | 0.698679 | 0.567511 | 0.332565 | 0.437596 |
| p17 | 0.671856 | 0.595426 | 0.646192 | 0.577062 | 0.755008 | 0.988389 | 0.890756 | 0.758288 | 0.436888 | 0.475293 |
| p18 | 0.753892 | 0.583596 | 0.603808 | 0.731186 | 0.6899 | 0.983924 | 0.957983 | 0.835443 | 0.404035 | 0.489047 |
| p19 | 0.726347 | 0.641167 | 0.596437 | 0.779651 | 0.616444 | 0.945222 | 0.981393 | 0.83906 | 0.372334 | 0.497198 |
| p20 | 0.659281 | 0.645899 | 0.581695 | 0.740217 | 0.593489 | 0.884787 | 0.89976 | 0.765823 | 0.383862 | 0.527254 |
| p21 | 0.552695 | 0.630915 | 0.652948 | 0.587297 | 0.717863 | 0.877047 | 0.761705 | 0.688366 | 0.379251 | 0.571574 |
| p22 | 0.664671 | 0.768927 | 0.7543 | 0.757676 | 0.867696 | 1 | 0.920168 | 0.852019 | 0.52853 | 0.700458 |
| p23 | 0.702994 | 0.737382 | 0.730958 | 0.953341 | 0.807179 | 0.997023 | 0.956783 | 1 | 0.530259 | 0.700458 |
| p24 | 0.749701 | 0.744479 | 0.654791 | 0.906382 | 0.75 | 0.949092 | 0.952581 | 0.947257 | 0.527954 | 0.779419 |
| p25 | 0.701198 | 0.730284 | 0.654791 | 0.798314 | 0.745409 | 0.883001 | 0.885954 | 0.817661 | 0.578098 | 0.790117 |
| p26 | 0.531737 | 0.672713 | 0.701474 | 0.640277 | 0.712437 | 0.716582 | 0.716687 | 0.72182 | 0.510663 | 0.691798 |
| p27 | 0.641317 | 0.694795 | 0.772113 | 0.80012 | 0.825125 | 0.859184 | 0.866146 | 0.842074 | 0.541787 | 0.835965 |
| p28 | 0.67006 | 0.701104 | 0.753686 | 0.911499 | 0.775042 | 0.861864 | 0.90036 | 0.959614 | 0.552161 | 0.925624 |
| p29 | 0.682635 | 0.634069 | 0.705774 | 0.902468 | 0.745409 | 0.838642 | 0.87515 | 0.911392 | 0.613833 | 1 |
| p30 | 0.62515 | 0.711356 | 0.690418 | 0.766406 | 0.733306 | 0.769277 | 0.802521 | 0.798373 | 0.631124 | 0.895059 |
| p31 | 0.541916 | 0.545741 | 0.717445 | 0.545455 | 0.573873 | 0.496279 | 0.669268 | 0.648282 | 0.481844 | 0.701477 |
| p32 | 0.628743 | 0.630126 | 0.719902 | 0.691752 | 0.643155 | 0.582912 | 0.759304 | 0.783002 | 0.504899 | 0.790117 |
| p33 | 0.630539 | 0.587539 | 0.677518 | 0.809452 | 0.606845 | 0.621018 | 0.778511 | 0.825497 | 0.493372 | 0.858889 |

METHOD FOR CALIBRATING SENSITIVITY OF TOUCH INPUT DEVICES SENSING TOUCH PRESSURE, AND COMPUTER READABLE RECORDING MEDIUM

CROSS-REFERENCE TO RELATED APPLICATIONS

This application is a U.S. national stage application under 35 U.S.C. § 371 of PCT Application No. PCT/KR2016/005505, filed May 25, 2016, which claims priority Korean Patent Application No. 10-2015-0077042, filed Jun. 1, 2015, the entireties of which are incorporated herein by reference.

TECHNICAL FIELD

The present disclosure relates to a sensitivity compensation method of a touch input device sensing a touch pressure and a computer-readable recording medium, and more particularly to a sensitivity compensation method of a touch input device sensing a touch pressure, which is capable of uniformly compensating for a touch pressure sensitivity for a touch sensor panel, and a computer-readable recording medium recording a program performing the method.

BACKGROUND ART

Various kinds of input devices for operating a computing system, for example, a button, key, joystick and touch screen, etc., are being developed and used. The touch screen has a variety of advantages, e.g., ease of operation, miniaturization of products and simplification of the manufacturing process, the most attention is paid to the touch screen.

The touch screen may constitute a touch surface of a touch input device including a touch sensor panel which may be a transparent panel including a touch-sensitive surface. The touch sensor panel is attached to the front side of the touch screen, and then the touch-sensitive surface may cover the touch screen. The touch screen allows a user to operate the computing system by touching the touch screen with his/her finger, etc. Accordingly, the computing system recognizes whether or not the touch has occurred on the touch screen and a touch position on the touch screen and performs arithmetic operations, thereby performing actions according to the user's intention.

Meanwhile, there is a requirement for a device for sensing even the touch pressure for convenience of operation and a research on the device is being conducted. However, in the sensing of the touch pressure, there is a problem that the touch pressure cannot be sensed with a uniform sensitivity on the display surface. Furthermore, due to the difference in the manufacturing process or manufacturing environment, different sensitivities may be shown for each manufactured product. For the purpose of complementing this, therefore, the touch pressure device needs to compensate for the sensitivity.

DISCLOSURE

Technical Problem

The present invention is designed in consideration of the above-described problems. The object of the present invention is to provide a touch input device sensing a touch pressure, in other words, is to provide a sensitivity compensation method of a touch input device sensing a touch pressure, which is capable of compensating for the touch pressure sensitivity of the touch input device such that the touch pressure is sensed with a uniform sensitivity on the front side of the display, and is to provide a computer-readable recording medium.

Technical Solution

One embodiment is a sensitivity compensation method of a touch input device sensing a touch pressure. The sensitivity compensation method includes: detecting, in a plurality of touch input device sets, a capacitance change amount by applying a pressure to a plurality of points defined on a touch sensor panel provided in the touch input device; generating a raw data for the capacitance change amount of the defined point, on the basis of the detected capacitance change amount; generating a decimal value data for each of the sets by dividing a data value within the set by a maximum value within the set; calculating an average value of each defined point, on the basis of the decimal value data generated for each of the sets; generating a representative value data by calculating a value corresponding to all the points of the touch sensor panel, on the basis of the average value of each of the points; calculating a balance factor on the basis of the representative value data; and compensating for a touch pressure sensitivity of the touch input device by using the balance factor.

The sensitivity compensation method may further include calibrating, by below-described equations 3 to 7, the capacitance change amount which is detected in the touch input device compensated in the compensating.

In the generating a raw data, an average value of a frame which corresponding to a saturated section in a frame data measured in the plurality of defined points may be calculated and determined as the capacitance change amount of the corresponding point.

In the generating a representative value data, a random point other than the plurality of points is interpolated on the basis of the average value of the plurality of defined points, so that an average value of the random point may be calculated.

The pressure which is applied to the plurality of defined points may be a pressure by 800 g and 8 phi.

The plurality of defined points may consist of 45 points consisting of five horizontal points and nine vertical points.

In the calculating a balance factor, the balance factor may be calculated by multiplying the representative value data by a predetermined factor "A".

In the calculating a balance factor, the balance factor may be calculated by multiplying the representative value data by a predetermined factor "A".

Another embodiment is a sensitivity compensation method of a touch input device sensing a touch pressure. The sensitivity compensation method may include:
detecting a capacitance change amount according to a pressure which is applied to the touch input device; and
calibrating the detected capacitance change amount by any one of below-described equations 3 to 7.

Further another embodiment is a computer readable recording medium recording a program which performs the sensitivity compensation method.

Advantageous Effects

Through the sensitivity compensation method of the input device and the computer-readable recording medium, it is possible to compensate for the sensitivity of the touch input device such that the touch pressure is sensed with a uniform sensitivity on the front side of the display.

DESCRIPTION OF DRAWINGS

FIG. 4 is a view showing decimal value data in sensitivity compensation method according to the embodiment of the present invention;

MODE FOR INVENTION

Figure 1:
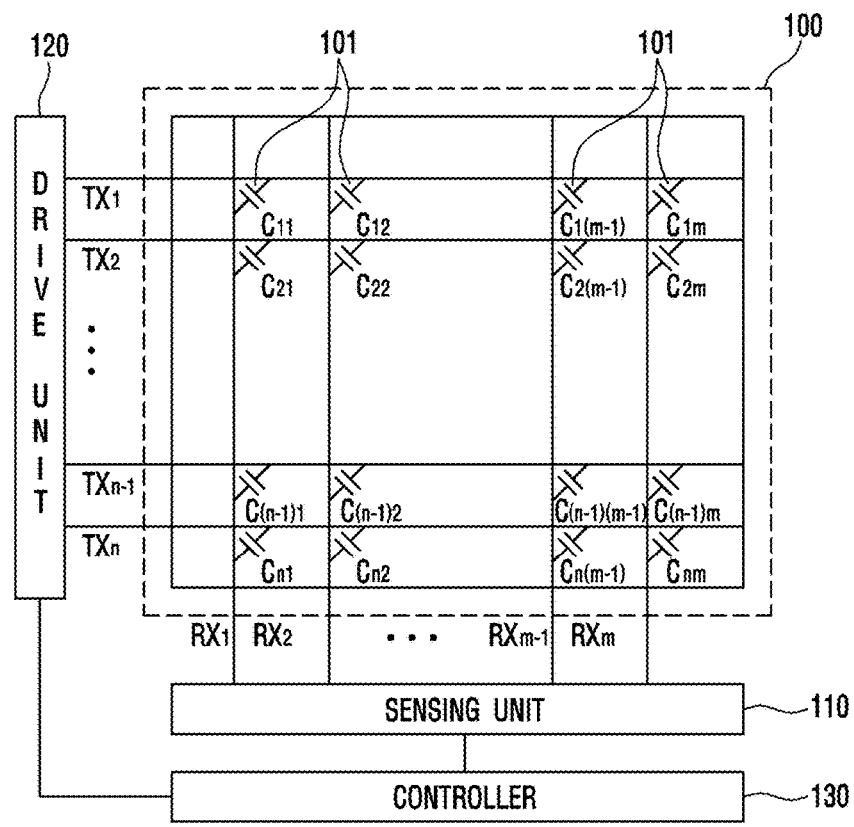
FIG. 1 is a schematic view showing a configuration of a touch input device to which a sensitivity compensation method of an embodiment of the present invention is applied.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

FIG. 1 is a schematic view showing a configuration of a touch input device to which a sensitivity compensation method of the present invention is applied.

Referring to FIG. 1, a touch sensor panel 100 according to the embodiment of the present invention may include a plurality of drive electrodes TX1 to TXn and a plurality of receiving electrodes RX1 to RXm. The touch sensor panel 100 may include a drive unit 120 which applies a drive signal to the plurality of drive electrodes TX1 to TXn for the purpose of the operation of the touch sensor panel 100, and a sensing unit 110 which detects the touch and a touch position by receiving a sensing signal including information on the capacitance change amount changing according to the touch on the touch surface of the touch sensor panel 100.

As shown in FIG. 1, the touch sensor panel 100 may include the plurality of drive electrodes TX1 to TXn and the plurality of receiving electrodes RX1 to RXm. While FIG. 1 shows that the plurality of drive electrodes TX1 to TXn and the plurality of receiving electrodes RX1 to RXm of the touch sensor panel 100 form an orthogonal array, the present invention is not limited to this. The plurality of drive electrodes TX1 to TXn and the plurality of receiving electrodes RX1 to RXm has an array of arbitrary dimension, for example, a diagonal array, a concentric array, a 3-dimensional random array, etc., and an array obtained by the application of them. Here, "n" and "m" are positive integers and may be the same as each other or may have different values. The magnitudes of the values may be different from each other.

As shown in FIG. 1, the plurality of drive electrodes TX1 to TXn and the plurality of receiving electrodes RX1 to RXm may be arranged to cross each other. The drive electrode TX may include the plurality of drive electrodes TX1 to TXn extending in a first axial direction. The receiving electrode RX may include the plurality of receiving electrodes RX1 to RXm extending in a second axial direction crossing the first axial direction.

In the touch sensor panel 100 according to the embodiment which is one component of the embodiment of the present invention, the plurality of drive electrodes TX1 to TXn and the plurality of receiving electrodes RX1 to RXm may be formed in the same layer. For example, the plurality of drive electrodes TX1 to TXn and the plurality of receiving electrodes RX1 to RXm may be formed on the same side of an insulation layer (not shown). Also, the plurality of drive electrodes TX1 to TXn and the plurality of receiving electrodes RX1 to RXm may be formed in different layers. For example, the plurality of drive electrodes TX1 to TXn and the plurality of receiving electrodes RX1 to RXm may be formed on both sides of one insulation layer (not shown) respectively, or the plurality of drive electrodes TX1 to TXn may be formed on a side of a first insulation layer (not shown) and the plurality of receiving electrodes RX1 to RXm may be formed on a side of a second insulation layer (not shown) different from the first insulation layer.

The plurality of drive electrodes TX1 to TXn and the plurality of receiving electrodes RX1 to RXm may be made of a transparent conductive material (for example, indium tin oxide (ITO) or antimony tin oxide (ATO) which is made of tin oxide ($SnO_2$), and indium oxide ($In_2O_3$), etc.), or the like. However, this is only an example. The drive electrode TX and the receiving electrode RX may be also made of another transparent conductive material or an opaque conductive material. For instance, the drive electrode TX and the receiving electrode RX may include at least any one of silver ink, copper, and carbon nanotube (CNT). Also, the drive electrode TX and the receiving electrode RX may be made of metal mesh or nano silver.

The drive unit 120 according to the embodiment which is one component of the touch input device 100 may apply a drive signal to the drive electrodes TX1 to TXn. In the touch input device 1000 according to the embodiment of the present invention, one drive signal may be sequentially applied at a time to the first drive electrode TX1 to the n-th drive electrode TXn. The drive signal may be applied again repeatedly. This is only an example. The drive signal may be applied to the plurality of drive electrodes at the same time in accordance with the embodiment.

Through the receiving electrodes RX1 to RXm, the sensing unit 110 receives the sensing signal including information on a capacitance (Cm) 101 generated between the receiving electrodes RX1 to RXm and the drive electrodes TX1 to TXn to which the drive signal has been applied, thereby detecting whether or not the touch has occurred and the touch position. For example, the sensing signal may be a signal coupled by the capacitance (Cm) 101 generated between the receiving electrode RX and the drive electrode TX to which the drive signal has been applied.

As such, the process of sensing the drive signal applied from the first drive electrode TX1 to the n-th drive electrode TXn through the receiving electrodes RX1 to RXm can be referred to as a process of scanning the touch sensor panel 100.

For example, the sensing unit 110 may include a receiver (not shown) which is connected to each of the receiving electrodes RX1 to RXm through a switch. The switch becomes the on-state in a time interval during which the signal of the corresponding receiving electrode RX is sensed, thereby allowing the receiver to sense the sensing signal from the receiving electrode RX. The receiver may include an amplifier (not shown) and a feedback capacitor coupled between the negative (−) input terminal of the amplifier and the output terminal of the amplifier, i.e., coupled to a feedback path. Here, the positive (+) input terminal of the amplifier may be connected to the ground. Also, the receiver may further include a reset switch which is connected in parallel with the feedback capacitor. The reset switch may reset the conversion from current to voltage that is performed by the receiver. The negative input terminal of the amplifier is connected to the corresponding receiving electrode RX and receives and integrates a current signal including information on the capacitance (CM) 101, and then converts the integrated current signal into voltage. The sensing unit 110 may further include an analog to digital converter (ADC) (not shown) which converts the integrated data by the receiver into digital data. Later, the digital data may be input to a processor (not shown) and processed to obtain information on the touch on the touch sensor panel 100. The sensing unit 110 may include the ADC and processor as well as the receiver.

A controller 130 may perform a function of controlling the operations of the drive unit 120 and the sensing unit 110. For example, the controller 130 generates and transmits a drive control signal to the drive unit 120, so that the drive signal can be applied to a predetermined drive electrode TX1 at a predetermined time. Also, the controller 130 generates and transmits the drive control signal to the sensing unit 110, so that the sensing unit 110 may receive the sensing signal from the predetermined receiving electrode RX at a predetermined time and perform a predetermined function.

In FIG. 1, the drive unit 120 and the sensing unit 110 may constitute a touch detection device (not shown) capable of detecting whether or not the touch has occurred on the touch sensor panel 100 of the touch input device 1000 according to the embodiment and the touch position. The touch input device 1000 according to the embodiment may further include the controller 130. In the embodiment of the present invention, the touch detection device according to the embodiment may be integrated and implemented on a touch sensing integrated circuit (IC) in a touch input device 1000 including the touch sensor panel 100. The drive electrode TX and the receiving electrode RX included in the touch sensor panel 100 may be connected to the drive unit 120 and the sensing unit 110 included in the touch sensing IC 150 through, for example, a conductive trace and/or a conductive pattern printed on a circuit board, or the like.

As described above, a capacitance (C) with a predetermined value is generated at each crossing of the drive electrode TX and the receiving electrode RX. When an object such as finger approaches close to the touch sensor panel 100, the value of the capacitance may be changed. In FIG. 1, the capacitance may represent a mutual capacitance (Cm). The sensing unit 110 senses such electrical characteristics, thereby being able to sense whether the touch has occurred on the touch sensor panel 100 or not and/or the touch position. For example, the sensing unit 110 is able to sense whether the touch has occurred on the surface of the touch sensor panel 100 comprised of a two-dimensional plane consisting of a first axis and a second axis and/or the touch position.

More specifically, when the touch occurs on the touch sensor panel 100, the drive electrode TX to which the drive signal has been applied is detected, so that the position of the second axial direction of the touch can be detected. Likewise, when the touch occurs on the touch sensor panel 100, a capacitance change is detected from the reception signal received through the receiving electrode RX, so that the position of the first axial direction of the touch can be detected.

The mutual capacitance type touch sensor panel as the touch sensor panel 100 has been described in detail in the foregoing. However, in the touch input device 1000 according to the embodiment of the present invention, the touch sensor panel 100 for detecting whether or not the touch has occurred and the touch position may be implemented by using not only the above-described method but also any touch sensing method like a self-capacitance type method, a surface capacitance type method, a projected capacitance type method, a resistance film method, a surface acoustic wave (SAW) method, an infrared method, an optical imaging method, a dispersive signal technology, and an acoustic pulse recognition method, etc.

In the touch input device 1000 according to the embodiment of the present invention, the touch sensor panel 100 for detecting the touch position may be positioned outside or inside a display module 200.

The display module 200 of the touch input device 1000 according to the embodiment of the present invention may be a liquid crystal display (LCD). Here, the display module 200 may have any one of an In Plane Switching (IPS) type, a Vertical Alignment (VA) type, and a Twisted Nematic (TN) type. Also, the display module 200 of the touch input device 1000 according to the embodiment of the present invention may be a display panel included in a plasma display panel (PDP), an organic light emitting diode (OLED), etc. Accordingly, a user may perform the input operation by touching the touch surface while visually identifying an image displayed on the display panel.

Here, the display module 200 may include a control circuit which receives an input from an application processor (AP) or a central processing unit (CPU) on a main board for the operation of the touch input device 100 and displays the contents that the user wants on the display panel.

Here, the control circuit for the operation of the display panel 200 may include a display panel control IC, a graphic controller IC, and other circuits required to operate the display panel 200.

Figure 2:
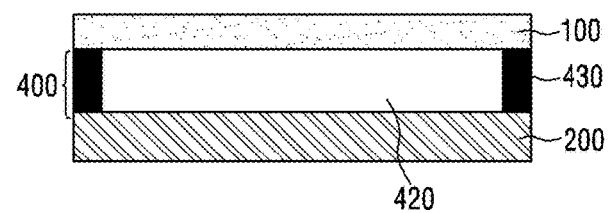
FIG. 2 is a cross sectional view of the touch input device configured to detect a touch position and a touch pressure, to which the sensitivity compensation method according to the embodiment of the present invention is applied.

FIG. 2 is a cross sectional view of the touch input device configured to detect a touch position and a touch pressure, to which the sensitivity compensation method according to the embodiment of the present invention is applied.

In the touch input device 1000 including the display module 200, a pressure detection module 400 and the touch sensor panel 100 which detects the touch position may be attached to the front side of the display module 200. Accordingly, it is possible to protect a display screen of the display module 200 and to increase a touch detection sensitivity of the touch sensor panel 100.

Here, the pressure detection module 400 may operate separately from the touch sensor panel 100 which detects the touch position. For example, the pressure detection module 400 may detect only the pressure independently of the touch sensor panel 100 which detects the touch position. Also, the pressure detection module 400 may be configured to be coupled to the touch sensor panel 100 which detects the touch position and to detect the touch pressure. For example, at least one of the drive electrode TX and the receiving electrode RX included in the touch sensor panel 100 which detects the touch position may be used to detect the touch pressure.

FIG. 2 shows that the pressure detection module 400 is coupled to the touch sensor panel 100 and detects the touch pressure. In FIG. 2, the pressure detection module 400 includes a spacer layer 420 which leaves a space between the touch sensor panel 100 and the display module 200. The pressure detection module 400 may include a reference potential layer spaced from the touch sensor panel 100 by the spacer layer 420. Here, the display module 200 may function as the reference potential layer.

The reference potential layer may have any potential which causes the change of the capacitance 101 generated between the drive electrode TX and the receiving electrode RX. For instance, the reference potential layer may be a ground layer having a ground potential. The reference potential layer may be the ground layer of the display module 200. Here, the reference potential layer may have a parallel plane with the two-dimensional plane of the touch sensor panel 100.

As shown in FIG. 2, the touch sensor panel 100 is disposed apart from the display module 200, i.e., the reference potential layer. Here, depending on a method for adhering the touch sensor panel 100 to the display module 200, the spacer layer 420 between the touch sensor panel 100 and the display module 200 may be implemented in the form of an air gap.

Here, a double adhesive tape (DAT) 430 may be used to fix the touch sensor panel 100 and the display module 200. For example, the areas the touch sensor panel 100 and the display module 200 are overlapped with each other. The touch sensor panel 100 and the display module 200 are adhered to each other by adhering the edge portions of the touch sensor panel 100 and the display module 200 through use of the DAT 430. The rest portions of the touch sensor panel 100 and the display module 200 may be spaced apart from each other by a predetermined distance "d".

In general, even when the touch surface is touched without bending the touch sensor panel 100, the capacitance (Cm) 101 between the drive electrode TX and the receiving electrode RX is changed. That is, when the touch occurs on the touch sensor panel 100, the mutual capacitance (Cm) 101 may become smaller than a base mutual capacitance. This is because, when the conductive object like a finger approaches close to the touch sensor panel 100, the object functions as the ground GND, and then a fringing capacitance of the mutual capacitance (Cm) 101 is absorbed in the object. The base mutual capacitance is the value of the mutual capacitance between the drive electrode TX and the receiving electrode RX when there is no touch on the touch sensor panel 100.

When the object touches the top surface, i.e., the touch surface of the touch sensor panel 100 and a pressure is applied to the top surface, the touch sensor panel 100 may be bent. Here, the value of the mutual capacitance (Cm) 101 between the drive electrode TX and the receiving electrode RX may be more reduced. This is because the bend of the touch sensor panel 100 causes the distance between the touch sensor panel 100 and the reference potential layer to be reduced, so that the fringing capacitance of the mutual capacitance (Cm) 101 is absorbed in the reference potential layer as well as in the object. When a nonconductive object touches, the change of the mutual capacitance (Cm) 101 is simply caused by only the change of the distance between the touch sensor panel 100 and the reference potential layer.

As described above, the touch input device 1000 is configured to include the touch sensor panel 100 and the pressure detection module 400 on the display module 200, so that not only the touch position but also the touch pressure can be simultaneously detected.

However, as shown in FIG. 2, when the pressure detection module 400 as well as the touch sensor panel 100 is disposed on the display module 200, the display properties of the display module is deteriorated. Particularly, when the air gap 420 is included on the display module 200, the visibility and optical transmittance of the display module may be lowered.

Accordingly, in order to prevent such problems, the air gap is not disposed between the display module 200 and the touch sensor panel 100 for detecting the touch position. Instead, the touch sensor panel 100 and the display module 200 can be fully laminated by means of an adhesive like an optically clear adhesive (OCA).

In the description related to FIGS. 1 and 2, the configuration of the touch input device 1000 to which the sensitivity compensation method according to the embodiment of the present invention is applied has been specified in order to describe the principle of detecting the touch position and the touch pressure. However, the sensitivity compensation method according to the embodiment of the present invention can be applied to any touch input device which is capable of the touch pressure and has a different structure from those shown in FIGS. 1 and 2.

Hereafter, the sensitivity compensation method of the touch input device sensing the touch pressure will be described in detail.

The sensitivity compensation method of the touch input device sensing the touch pressure in accordance with the embodiment of the present invention includes a balance process and a calibration process.

First, the balance process will be described. The balance process is for making a deviation according to the position within a plurality of touch input device sets uniform. The balance process may be performed by using about 20 to 200 samples in DVT step before the final production of one set.

The balance process is composed of below-described steps, that is to say, (1) a raw data measurement, (2) an average value calculation, (3) calculation of a ratio to the maximum value, and (4) interpolation. Additionally, any one of them may be omitted, or other steps may be added.

After the steps (1) to (4) are all performed, a balance factor of 0 to 255 number of 8 bit range is obtained for each node. By applying the balance factor to the touch input device, the sensitivity of the touch sensor panel of the touch input device is uniformly compensated.

First, a step of obtaining a raw data is performed. In the description, a total of 45 points consisting of five horizontal points and nine vertical points are measured by using a weight of 800 g and 8 phi.

With regard to the number of the points, when the balance factor obtained by measuring by three horizontal points and five vertical points on the basis of 5 inches is applied, there is no linearity between the points.

Also, when the balance process is performed by a larger number than 45 of the points, adjacent points come to overlap each other, so that it is difficult to check from which node the balance factor comes in the interpolation of the balance factor. Therefore, in the embodiment of the present invention, a total of 45 points consisting of five horizontal points and nine vertical points are used.

However, the number of the points may increase or decrease depending on the size of the touch sensor panel. The number of the points may be appropriately determined according to the size of the touch sensor panel and the state of each of the sets.

Meanwhile, the applying of the pressure by using the weight of 800 g and 8 phi is for optimally modeling the index finger of human. However, the weight or radius of the weight may be differently set because the pressing force or finger's size varies depending on a person.

In order to generate the capacitance change amount for the pressure according to the position, that is, a raw data, at a total of 45 points by using the weight of 800 g and 8 phi, a device such as a key life tester or MUSASHI may be used.

A pressure is applied to the 45 points by the weight of 800 g and 8 phi, and the capacitance change amount at each of the points is calculated. The detection of the capacitance change amount has been described as above.

The process of calculating a capacitance change amount data is as follows. A frame data measured at each point is checked and the capacitance change amount is detected according to the time. Then, a sufficiently saturated section is found and N (N is a natural number) number of frames in the section is averaged, so that the capacitance change amount of the point is obtained.

Figure 3:
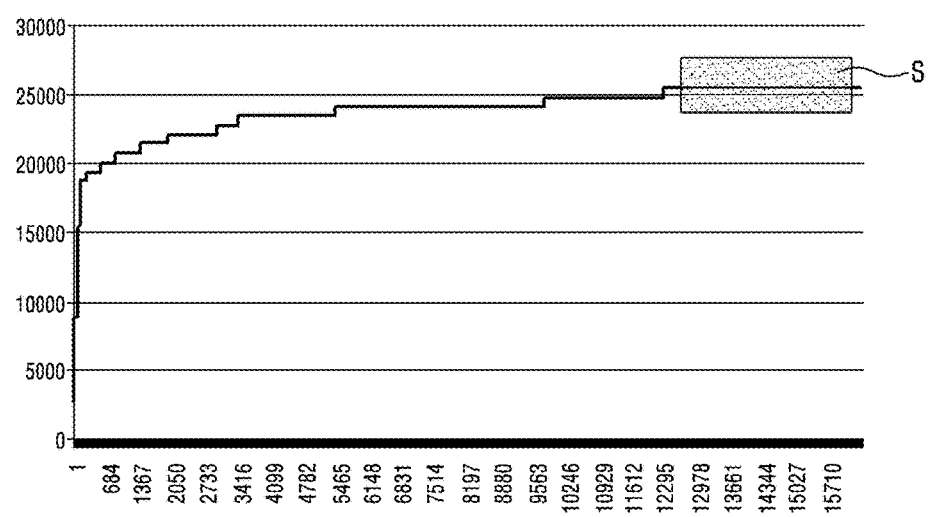
FIG. 3 is a view for describing a process of generating a raw data in the sensitivity compensation method according to the embodiment of the present invention.

FIG. 3 shows the frame data and saturated section at one point. The x-axis represents time, and the y-axis represents the capacitance change amount detected in each frame. Here, the unit of time may be about 5 ms per one unit and may be changed to another value without being limited to this.

In the graph of FIG. 3, it can be seen that saturation has occurred in the section S after 61.5 s (12295*5 ms). The average of five frames belonging to the section S is calculated, so that the capacitance change amount of the corresponding to the point is determined.

When the value of the capacitance change amount of each point is determined by using the frame data, a measurement error caused by jitter can be reduced. Here, it is preferable that the number of the frames used to calculate the average value for determining the capacitance change amount should be from 20 to 100. In this manner, the average values of all the points are calculated and a frame average value data of a total of 45 points is generated.

The generated frame average value data is divided by the maximum value (max) within the set and is converted into a decimal number in a range of 0 to 1. Through this process, 45 point data of each set in the range of 0 to 1 is obtained.

FIG. 4 shows a decimal value data for 45 points of each set, which is obtained by dividing the frame average value data by the maximum value within the set and by converting into a decimal number. In FIG. 4, each column represents set names (set1, set2, set3, . . . ), and each row represents points (p1, p2, p3, . . . , p45).

Regarding the data according to the set shown in FIG. 4, the average value is calculated for each point. That is, the average value of the first point p1 is calculated by adding first point values of all the sets and by dividing by the number of the sets.

Likewise, the average value of the second point p2 is calculated by adding second point values of all the sets and by dividing by the number of the sets.

As such, when the average value of the $45^{th}$ point p45 is calculated, one representative value data is generated. That is, the representative value data includes the average value of each point of all the sets.

In the above description, the ratio to the maximum value is calculated because ratios in which respective sets are reflected in the representative value are made same as each other. The balance process intends to reduce the deviation according to the position in each set. Therefore, while the difference between the sets is not very important, the difference according to the position within the set is very important. In order to check this, the ratio to the maximum value is calculated.

The process of calculating the ratio to the maximum value may be omitted. In this case, however, the average value is calculated under the condition that it is determined that the position where the capacitance change amount of 500 is detected when the maximum value is 3000 is the same as the position where the capacitance change amount of 500 is detected when the maximum value is 10,000. Therefore, the deviation according to the position becomes difficult to reduce. Namely, the deviation according to the position can be effectively reduced by calculating the ratio to the maximum value.

After the above process is completed, 45 point representative value data in the range of 0 to 1 is obtained. The representative data is used to obtain the node-based balance factor having a value of 0 to 255. Here, the node means each cell of FIG. 5. That is, if all of the cells of FIG. 5 are assumed to be a touch sensor panel surface, each of the nodes may be mapped to the same position.

The value measured at the 45 points is interpolated for each node and is changed to the value measured for each node. Here, the data of each point is brought to the node corresponding to the point measured by using pitches of the drive electrode Tx and the receiving electrode Rx.

Figures 5, 6:
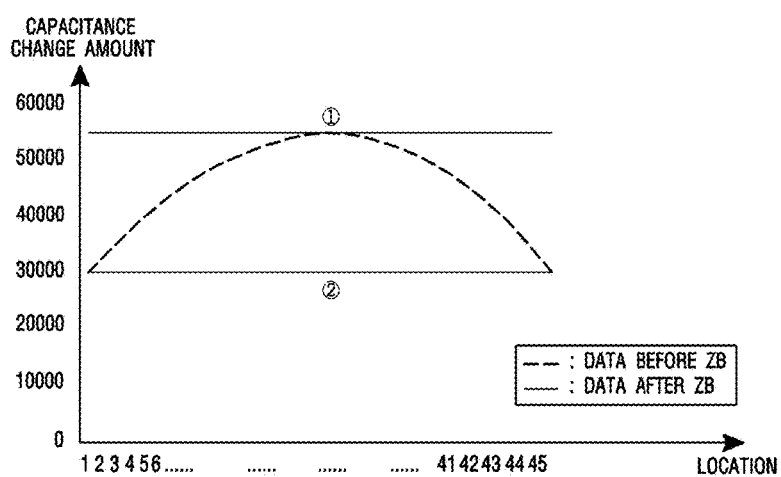
FIG. 5 is a view for describing a process of interpolating a representative value for all nodes in the sensitivity compensation method according to the embodiment of the present invention.
FIGS. 6 and 7 are graphs for describing the interpolation method which is used in the sensitivity compensation method according to the embodiment of the present invention.

In FIG. 5, 45 points are in correspondence with the Y region. By using the following equation (1), a value corresponding to the node included in the B region of FIG. 5 is calculated. FIG. 5 shows the Y region, B region, G region, and O region. The Y region means a region including the node corresponding to the 45 points. The B region means a region including the node existing between the nodes of the Y region. The G region means a region including the node which is immediately adjacent to the nodes of the Y region and the B region and surrounds the Y region and the B region. The O region means a region including the remaining nodes located outside the G region.

$$X * \frac{n}{x-y} + Y * \frac{(x-y)-n}{x-y} \quad \text{Equation (1)}$$

Here, "X" and "Y" represents an X node value and a Y node value respectively, and "x" and "y" represent the location of the node. "n" represents a distance between the X node and a node at which the value is intended to be calculated. Also, By using the following equation (2), a value corresponding to the node included in the G region of FIG. 5 is calculated.

$$X1 - \frac{|x1 - x2|}{2} \quad \text{Equation (2)}$$

Here, "X1" represents the value of the node which is one space away from the node where the calculation is to be performed. "X2" represents the value of the node which is two spaces away. That is, a value decreased by a half of a gradient between a preceding node and a node before the preceding node is determined as the value of the node.

The O region is made to have the same value as those of the G region. The value of the O region is filled in this manner because this intends to reduce the difference between the minimum value (min) and the maximum value (max).

If the equation (2) expands to the O region without applying ½, a negative number may be generated depending on the slope. Therefore, it is difficult to expand to the O region in this manner. Also, even though a negative number is not generated, there may be a big difference between the minimum value and the maximum value in the entire data. In such a case, an error at the edge portion of the raw data becomes larger and the balance factor becomes too larger or smaller. Accordingly, the saturation may occur even by a small force, or there is no reaction no matter how strong the pressing may be due to too insensitively being applied.

A resolution problem may occur. The balance process is basically designed on the basis of the minimum value. In the balance process, a standard for a value to be balanced is determined. Here, when the maximum value is the standard, values greater than or equal to the maximum value is multiplied by a factor less than 1, so that a graph ② shown in FIG. 6 will be obtained. When a value between the maximum value and the minimum value is the standard, a straight line between the graphs ① and ② will be obtained.

Figure 7:
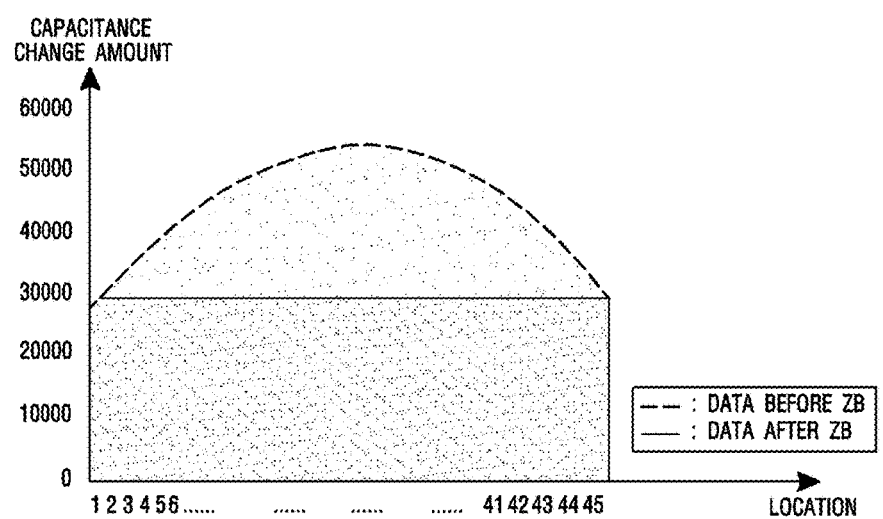

The balance process is not performed on the basis of the maximum value because of a resolution problem. The resolution mentioned herein refers to a resolution for the capacitance change amount according to the weight. The data according to the weight which is represented by an actual capacitance change amount is shown in FIG. 7.

In other words, considering only the data corresponding to one pressure, for example, a pressure by the weight of 800 g, the graph shown in FIG. 6 is obtained. When the data corresponding to the pressure by the weight of 0 to 800 g is displayed together, integrated values are obtained, so that a two dimension form shown in FIG. 7 is obtained.

Considering this, it can be seen that there is a big difference between the graphs ① and ② of FIG. 6. This is because the balance process is not performed in an analog manner but is performed in a digital manner, so that a density difference occurs in the graphs ① and ②.

When the balance process is performed on the basis of the maximum value as shown in the graph ①, the portion with no data in the portion having the minimum value should be interpolated. Therefore, the density is decreased in the capacitance change amount according to the weight, so that the low-density data composed of 1, 3, 5, 7, and 9 is generated, and the resolution decreases.

On the contrary, when the balance process is performed on the basis of the minimum value, the density increases, so that the data composed of 0.8, 1.6, 2.4, 3.2, and 4.0 is generated in the portion having the maximum value. This case is only described in detail and has no problem.

However, returning to the beginning, if there occurs a big difference between the maximum value and the minimum value, the data of the maximum value becomes denser than necessary and there occurs a data loss through a calibration process. Therefore, when there occurs a big difference between the maximum value and the minimum value, the resolution is damaged.

In consideration of this, the above-described interpolation process is performed.

The range of 0 to 255 is obtained by multiplying the entire node value of the representative value (see FIG. 5) according to the node in the range of 0 to 1 by a factor "A", so that the balance factor according to the node is finally obtained. Here, the range of 0 to 255 for obtaining the balance factor according to the node may have a different range. For example, the range of 0 to 1, 0 to 65535, etc., may be set. With regard to this, the embodiment of the present invention is not limited to a specific range.

Figures 8, 9:
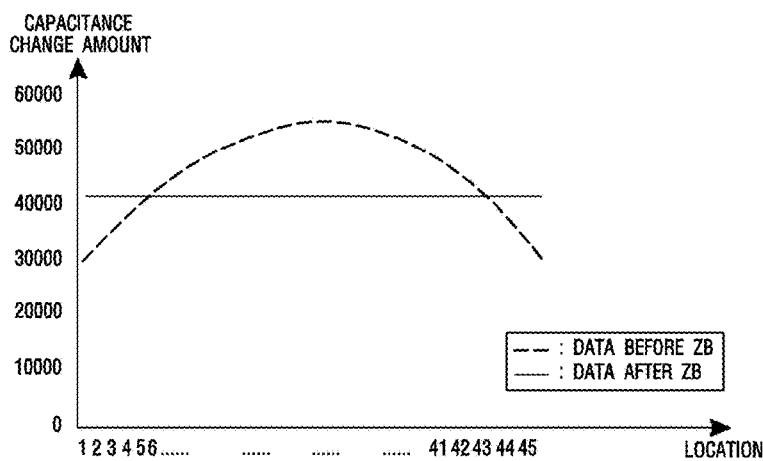
FIG. 8 shows a data showing balance factors of all the nodes.
FIG. 9 is a graph showing a comparison between a sensitivity of each node before performing a balance process and a sensitivity of each node after performing the balance process.

Specifically, a below-described balance factor data of FIG. 8 is obtained by multiplying the inverse number of each node value of FIG. 5 by the factor "A". The factor "A" is given 8.4.

FIG. 8 shows the data showing balance factors of all the nodes, which have been finally completed. By applying the balance factor of FIG. 8 to the touch sensor panel, a uniform sensitivity at all the nodes can be achieved.

FIG. 9 is a graph showing a comparison between the sensitivity of each node before performing the balance process and the sensitivity of each node after performing the balance process. The x-axis represents the position on the touch sensor panel (each point or node), and the y-axis represents the capacitance change amount. The dotted-line graph is based on the data before the balance is achieved. The solid-line graph is based on the data after the balance is achieved.

As shown in FIG. 9, while each position of the touch sensor panel has a different sensitivity before the balance process, all the positions have a uniform sensitivity after the balance process (solid line).

After the above-described balance process is completed, a calibration process is then performed.

The calibration may be performed simply by multiplication. That is, the calibration may be performed, in which the capacitance change amount value measured at all the points of the touch sensor panel is multiplied by a specific factor, so that the value is adjusted to be constant. Here, the following equation (3) is used.

$$Z = Diffsum * \frac{Target}{Center800 \, g \, diff} \quad \text{Equation (3)}$$

Here, "Z" represents the capacitance change amount after the calibration process. "Diffsum" represents the capacitance change amount before the calibration process. "Target" represents a target value. "Center800 g diff" represents the capacitance change amount of a center point (a point located at the center of the touch sensor panel) before the calibration process. The target value may be set to a value equivalent to 80% of the data of the capacitance change amount due to the pressure applied by a force of 800 g. However, without being limited to this, the target value may be set to a value in a range different from the above in another embodiment. For example, in the case of standard AP, 52428, which is 80% of 0 to 65535, may be used as the target value.

Figure 10:
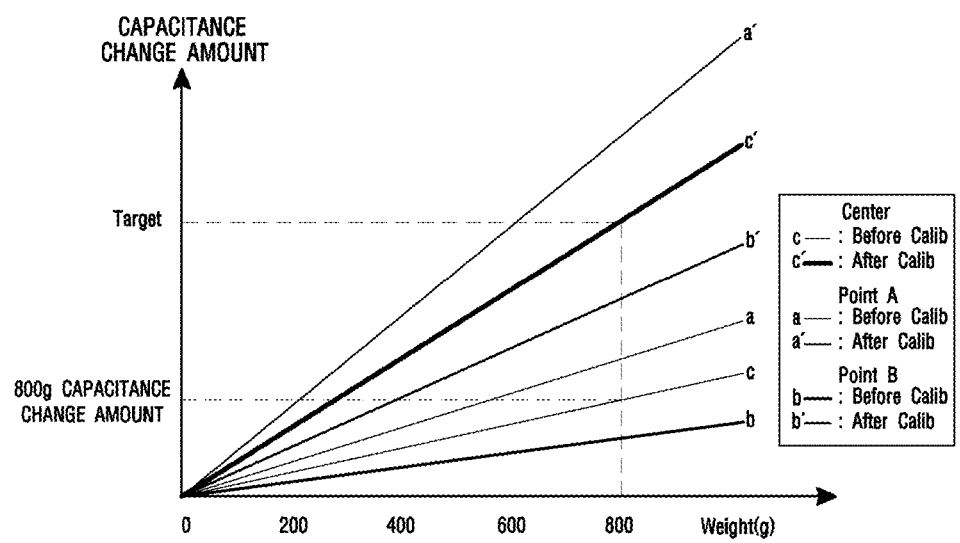
FIG. 10 is a graph for describing a problem caused by a multiplication type calibration in a calibration process of the sensitivity compensation method according to the embodiment of the present invention.

Here, the balance is performed by the average of the samples in the balance process. Therefore, when the calibration is performed simply by multiplication, the following problem may occur. FIG. 10 is a graph for describing such a problem and shows the capacitance change amount due to the weight according to the position, to which the equation (3) has been applied.

In FIG. 10, the x-axis represents a pressure (according to the weight), and the y-axis represents the capacitance change amount.

If the capacitance change amount detected by applying a predetermined pressure (a pressure by 800 g) is 100, 200, and 300 at three points a, b, and c respectively before the calibration, the difference between the remaining two points is ±100 on the basis of the average value of 200.

When it is assumed that a multiplication type calibration is performed on the basis of 2000, i.e., ten times that of the average value of 200, the slope of the graph for each of the points moves (a', b', and c'). The value of "Z" at this point of time is 1000, 2000, and 3000 respectively. Regarding the remaining two points with respect to the average value of 2000, the difference between the two points increases significantly to ±1000. This needs to be improved. There are two methods therefor.

First, one method is to define the target value to be smaller than the value before the calibration. For example, in the above description, if the calibration is performed on the basis of 100 that is ½ of 200, the value of "Z" is 50, 100, and 150, the difference is ±50, so that the sensitivity is further improved. However, in this case, it is meaningful only when the target value is smaller than the capacitance change amount of the set with the smallest capacitance change amount. At this time, the calibration is performed with a very low value, and thus, the touch input device is vulnerable to noise.

Second, the other method is to apply different balance factors to each set. However, this method deviates from the balance process's original intent that the deviation according to the position is decreased by applying the same value, and the data according to the position for each set is required. Therefore, there is a problem that too many points should be punched during the production thereof.

In order to overcome the problem, an addition type calibration instead of the simple multiplication type calibration is proposed in the performing of the calibration of the embodiment of the present invention. Here, the following equation (4) may be used.

$$Z = Diffsum + (Target - Canter800\ g\ diff) \quad \text{Equation (4)}$$

Here, "Z" represents the capacitance change amount after the calibration process. "Diffsum" represents the capacitance change amount before the calibration process. "Target" represents a target value. "Center800 g diff" represents the capacitance change amount of the center point (a point located at the center of the touch sensor panel) before the calibration process.

Figure 11:
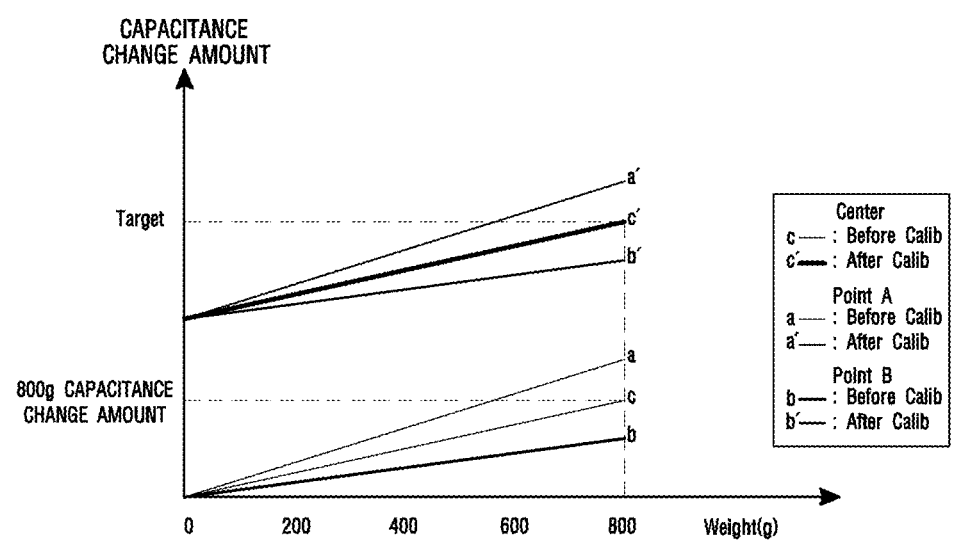
FIG. 11 is a graph for describing effects of an addition type calibration in the calibration process of the sensitivity compensation method according to the embodiment of the present invention.

FIG. 11 is a graph to which the addition type calibration has been applied. As shown in FIG. 11, through use of the addition type calibration, it is possible to move the capacitance change amount close to the target value, while maintaining the slope of the graph as it is.

For example, if the capacitance change amount detected by applying a predetermined pressure (a pressure by 800 g) is 100, 200, and 300 at three points respectively before the calibration, the difference between the remaining two points is ±100 on the basis of the average value of 200.

Here, assuming that the addition type calibration is performed, the value of "Z" is 1900, 2000, and 2100 respectively, and thus, the difference of ±100 is maintained as it is. Therefore, the above problem can be overcome.

Further, a hybrid method which combines the advantages of the multiplication and addition is proposed as a method for complementing the multiplication type calibration. Here, the following equation (5) may be used.

$$Z = \min\left[diffsum * \frac{Target}{Center800\ g\ diff},\ Diffsum + (Target - Center800\ g\ diff)\right] \quad \text{Equation (5)}$$

Here, "Z" represents the capacitance change amount after the calibration process. "Diffsum" represents the capacitance change amount before the calibration process. "Target" represents a target value. "Center800 g diff" represents the capacitance change amount of the center point (a point located at the center of the touch sensor panel) before the calibration process.

Figure 12:
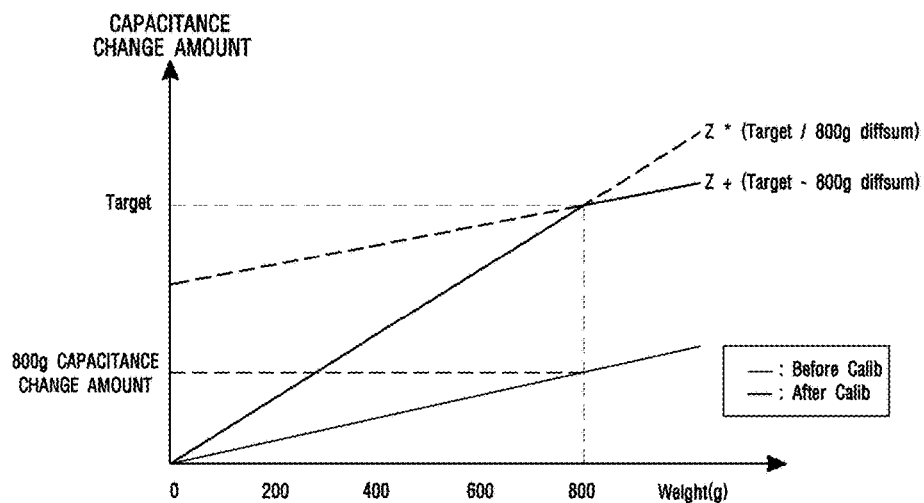
FIGS. 12 and 13 are graphs for describing effects of a hybrid type calibration in the calibration process of the sensitivity compensation method according to the embodiment of the present invention.

FIG. 12 shows that the hybrid type calibration using the equation (5) is applied. As shown in FIG. 12, when the capacitance change amount is less than the target value, the multiplication type calibration is used, and when the capacitance change amount is greater than the target value, the addition type calibration is used.

Figure 13:
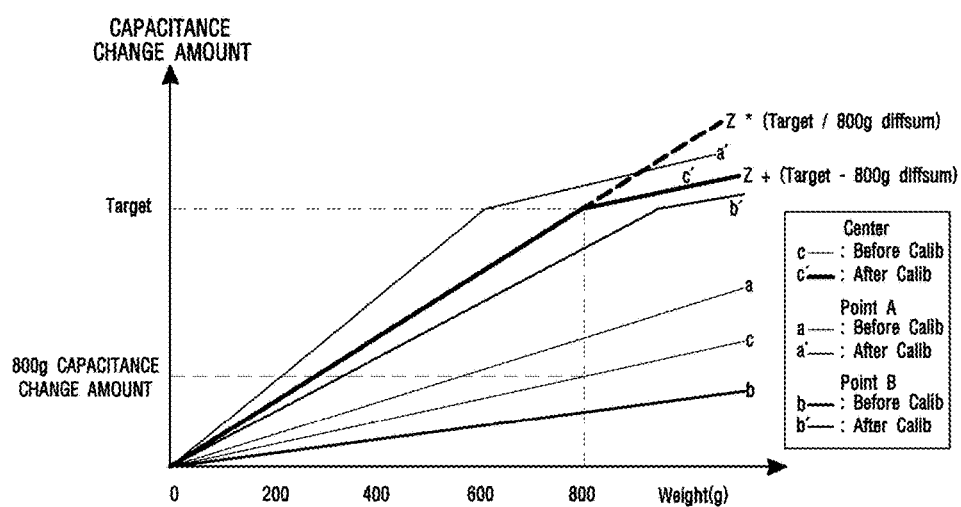

Furthermore, FIG. 13 is a graph showing a result of performing the hybrid type calibration at three position points.

As shown in FIG. 13, if the capacitance change amount detected by applying a predetermined pressure (a pressure by 800 g) is 100, 200, and 300 at three position points respectively before the calibration, the difference between the remaining two points is ±100 on the basis of the average value of 200.

Assuming that the hybrid type calibration is performed, the value of "Z" after the calibration is 1900, 2000, and 2100 respectively. That is, a smaller difference occurs between the points. Particularly, in the data of a high pressure (a pressure by the weight greater than 800 g), even a value smaller than the target value comes to exceed the intermediate value of 2000, so that the calibration is converted into the addition type calibration, and thus, the difference of the capacitance change amount is decreased.

Also, through use of the hybrid type calibration, the difference according to the position is sensitively sensed when a great force is applied, so that the user feels like that the sensitivity compensation has been well made.

Meanwhile, when the target value is less than the capacitance change amount sensed at the center point before the calibration, a problem may occur. In the general case, the target value is set to be larger than the capacitance change amount at the center point. However, there may be a case where not.

Figure 14:
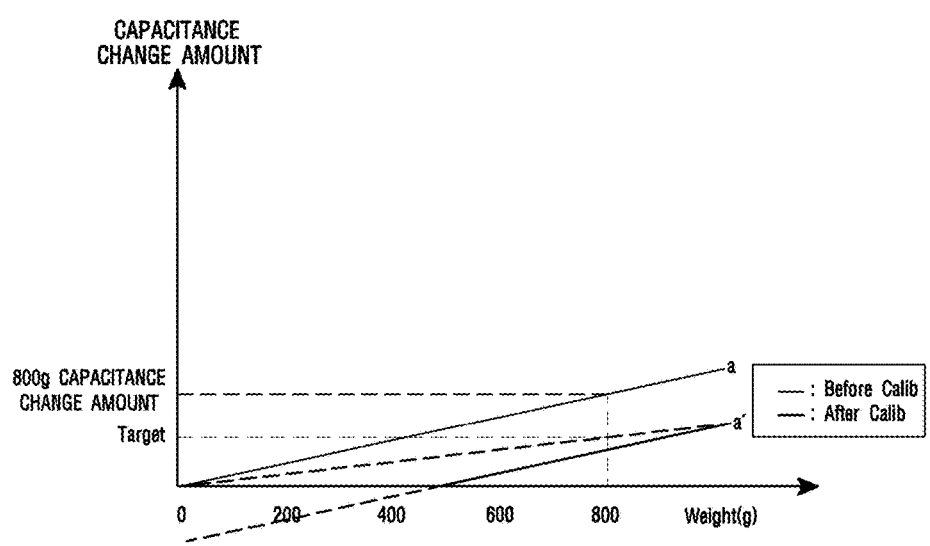
FIG. 14 is a graph for describing a calibration for complementing the hybrid type calibration in the calibration process of the sensitivity compensation method according to the embodiment of the present invention.

FIG. 14 is a graph to which the hybrid type calibration has been applied when the target value is less than the capacitance change amount at the center point. As shown in FIG. 14, there is a zone (dead zone) in which a low pressure (a pressure by the weight smaller than 500 g) cannot be sensed. In order to complement this, the following equation (6) may be used in the embodiment of the present invention.

$$\text{if(Target} > \text{Center800 g } \mathit{diff})$$
$$Z = \min\left[\mathit{Diffsum} * \frac{\text{Target}}{\text{Center800 g } \mathit{diff}},\right.$$
$$\left.\mathit{Diffsum} + (\text{Target} - \text{Center800 g } \mathit{diff})\right]$$
$$\text{else}$$
$$Z = \mathit{Diffsum} * \frac{\text{Target}}{\text{Center800 g } \mathit{diff}}$$

Equation (6)

Here, "Z" represents the capacitance change amount after the calibration process. "Diffsum" represents the capacitance change amount before the calibration process. "Target" represents a target value. "Center800 g diff" represents the capacitance change amount of the center point (a point located at the center of the touch sensor panel) before the calibration process.

In other words, when the target value is larger than the capacitance change amount at the center point, the hybrid type calibration is used, and when the target value is less than the capacitance change amount at the center point, the multiplication type calibration is used.

Furthermore, in the embodiment of the present invention, in consideration of the fact that the force control is different for each person, it is intended to make every person feel a similar sensitivity by setting an offset. Here, the following equation (7) may be used.

$$\text{if(Target} > \text{Center800 g } \mathit{diff})$$
$$Z = \min\left[\mathit{Diffsum} * \frac{\text{Target}}{\text{Center800 g } \mathit{diff}},\right.$$
$$\left.\mathit{Diffsum} + (\text{Target} - \text{Center800 g } \mathit{diff})\right] + \text{Offset}$$
$$\text{else}$$
$$Z = \mathit{Diffsum} * \frac{\text{Target}}{\text{Center800 g } \mathit{diff}} + \text{Offset}$$

Equation (7)

Here, "Z" represents the capacitance change amount after the calibration process. "Diffsum" represents the capacitance change amount before the calibration process. "Target" represents a target value. "Center800 g diff" represents the capacitance change amount of the center point (a point located at the center of the touch sensor panel) before the calibration process.

By using the equation (7), it is possible to obtain an effect to solve the offset problem which may occur in the above-described addition type calibration.

Here, the offset of the equation (7) is based on the premise that a very weak force is applied, and the offset may be assumed to be 5 to 10% of the total. That is, when the pressure value to be displayed is 0 to 65535, the offset may be assumed to be 3277 to 6553 that is 5 to 10% of the pressure value. Needless to say, the embodiment of the present invention is not limited to the above value, and the offset may be set in different ways in another embodiment.

Meanwhile, the present invention may be implemented in the form of a computer-readable recording medium recording a program which performs each of the steps included in the above-described sensitivity compensation method.

That is, at least one of the balance process and the calibration process may be performed by the program recorded in the recording medium according to the embodiment of the present invention.

The program instruction which is recorded in the computer readable recording medium may be specially designed and configured for the present invention or may be well-known and available to those skilled in the field of computer software.

The computer-readable recording medium may include a hardware device, for example, a magnetic medium such as a hard disk, a floppy disk, and a magnetic tape, an optical recording medium such as CD-ROM, DVD, a magneto-optical medium such as a floptical disk, and ROM, RAM, flash memory, etc., which is especially configured to store and perform program instructions.

The program instruction may include not only a machine language code which is formed by a complier but also high-level language code which can be executed by a computer using an interpreter, etc.

The hardware device may be configured to operate as one or more software modules in order to perform the process according to the present invention, and vice versa.

The features, structures and effects and the like described in the embodiments are included in one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

REFERENCE NUMERALS 100 touch sensor panel
110 sensing unit
120 drive unit
130 controller
200 display module
1000 touch input device

The invention claimed is:

1. A sensitivity compensation method of a touch input device sensing a touch pressure, the sensitivity compensation method comprising:
   detecting, in a plurality of touch input device sets, a capacitance change amount by applying a pressure to a plurality of points defined on a touch sensor panel provided in the touch input device;

generating a raw data for the capacitance change amount of the defined point, on the basis of the detected capacitance change amount;

generating a decimal value data for each of the sets by dividing a data value within the set by a maximum value within the set;

calculating an average value of each defined point, on the basis of the decimal value data generated for each of the sets;

generating a representative value data by calculating a value corresponding to all the points of the touch sensor panel, on the basis of the average value of each point;

calculating a balance factor on the basis of the representative value data; and compensating for a touch pressure sensitivity of the touch input device by using the balance factor.

2. The sensitivity compensation method of claim 1, further comprising calibrating, by the following equation, the capacitance change amount which is detected in the touch input device compensated in the compensating, $$Z = \textit{Diffsum} * \frac{\textit{Target}}{\textit{Center800 g diff}}$$

("Z": a value of a corresponding point after the calibration, "Diffsum": the capacitance change amount detected at the corresponding point before the calibration, "Target": a target value, "Center800 g diff": the capacitance change amount detected at a center point (a point located at the center of the touch sensor panel) before the calibration).

3. The sensitivity compensation method of claim 1, further comprising calibrating, by the following equation, the capacitance change amount which is detected in the touch input device compensated in the compensating, Z=Diffsum+(Target−Center800 g diff)

("Z": a value of a corresponding point after the calibration, "Diffsum": the capacitance change amount detected at the corresponding point before the calibration, "Target": a target value, "Center800 g diff": the capacitance change amount detected at a center point (a point located at the center of the touch sensor panel) before the calibration).

4. The sensitivity compensation method of claim 1, further comprising calibrating, by the following equation, the capacitance change amount which is detected in the touch input device compensated in the compensating, $$Z = \min\left[\textit{diffsum} * \frac{\textit{Target}}{\textit{Center800 g diff}},\right.$$
$$\left. \textit{Diffsum} + (\textit{Target} - \textit{Center800 g diff})\right]$$

("Z": a value of a corresponding point after the calibration, "Diffsum": the capacitance change amount detected at the corresponding point before the calibration, "Target": a target value, "Center800 g diff": the capacitance change amount detected at a center point (a point located at the center of the touch sensor panel) before the calibration).

5. The sensitivity compensation method of claim 1, further comprising calibrating, by the following equation, the capacitance change amount which is detected in the touch input device compensated in the compensating, if(Target > Center800 g diff)
$$Z = \min\left[\textit{Diffsum} * \frac{\textit{Target}}{\textit{Center800 g diff}},\right.$$
$$\left. \textit{Diffsum} + (\textit{Target} - \textit{Center800 g diff})\right]$$
else
$$Z = \textit{Diffsum} * \frac{\textit{Target}}{\textit{Center800 g diff}}$$

("Z": a value of a corresponding point after the calibration, "Diffsum": the capacitance change amount detected at the corresponding point before the calibration, "Target": a target value, "Center800 g diff": the capacitance change amount detected at a center point (a point located at the center of the touch sensor panel) before the calibration).

6. The sensitivity compensation method of claim 1, further comprising calibrating, by the following equation, the capacitance change amount which is detected in the touch input device compensated in the compensating, if(Target > Center800 g diff)
$$Z = \min\left[\textit{Diffsum} * \frac{\textit{Target}}{\textit{Center800 g diff}},\right.$$
$$\left. \textit{Diffsum} + (\textit{Target} - \textit{Center800 g diff})\right] + \textit{Offset}$$
else
$$Z = \textit{Diffsum} * \frac{\textit{Target}}{\textit{Center800 g diff}} + \textit{Offset}$$

("Z": a value of a corresponding point after the calibration, "Diffsum": the capacitance change amount detected at the corresponding point before the calibration, "Target": a target value, "Center800 g diff": the capacitance change amount detected at a center point (a point located at the center of the touch sensor panel) before the calibration, Offset: offset).

7. The sensitivity compensation method of claim 1, wherein, in the generating a raw data, an average value of a frame which corresponding to a saturated section in a frame data measured in the plurality of defined points is calculated and is determined as the capacitance change amount of the corresponding point.

8. The sensitivity compensation method of claim 1, wherein, in the generating a representative value data, a random point other than the plurality of points is interpolated on the basis of the average value of the plurality of defined points, so that an average value of the random point is calculated.

9. The sensitivity compensation method of claim 1, wherein the pressure which is applied to the plurality of defined points is a pressure by 800 g and 8 phi.

10. The sensitivity compensation method of claim 1, wherein the plurality of defined points consist of 45 points consisting of five horizontal points and nine vertical points.

11. The sensitivity compensation method of claim 1, wherein, in the calculating a balance factor, the balance factor is calculated by multiplying the representative value data by a predetermined factor "A".

12. A sensitivity compensation method of a touch input device sensing a touch pressure, the sensitivity compensation method comprising:

detecting a capacitance change amount according to a pressure which is applied to the touch input device; and calibrating the detected capacitance change amount by the following equation, $$Z = \textit{Diffsum} * \frac{\text{Target}}{\text{Center800 g } \textit{diff}}$$

("Z": a value of a corresponding point after the calibration, "Diffsum": the capacitance change amount detected at the corresponding point before the calibration, "Target": a target value, "Center800 g diff": the capacitance change amount detected at a center point (a point located at the center of the touch sensor panel) before the calibration).

13. A sensitivity compensation method of a touch input device sensing a touch pressure, the sensitivity compensation method comprising:

detecting a capacitance change amount according to a pressure which is applied to the touch input device; and calibrating the detected capacitance change amount by the following equation, Z=Diffsum+(Target−Center800 g diff)

("Z": a value of a corresponding point after the calibration, "Diffsum": the capacitance change amount detected at the corresponding point before the calibration, "Target": a target value, "Center800 g diff": the capacitance change amount detected at a center point (a point located at the center of the touch sensor panel) before the calibration).

14. A sensitivity compensation method of a touch input device sensing a touch pressure, the sensitivity compensation method comprising:

detecting a capacitance change amount according to a pressure which is applied to the touch input device; and calibrating the detected capacitance change amount by the following equation, $$Z = \min\left[\textit{diffsum} * \frac{\text{Target}}{\text{Center800 g } \textit{diff}},\right.$$

$$\left.\textit{Diffsum} + (\text{Target} - \text{Center800 g } \textit{diff})\right]$$

("Z": a value of a corresponding point after the calibration, "Diffsum": the capacitance change amount detected at the corresponding point before the calibration, "Target": a target value, "Center800 g diff": the capacitance change amount detected at a center point (a point located at the center of the touch sensor panel) before the calibration).

15. A sensitivity compensation method of a touch input device sensing a touch pressure, the sensitivity compensation method comprising:

detecting a capacitance change amount according to a pressure which is applied to the touch input device; and calibrating the detected capacitance change amount by the following equation, $$\text{if}(\text{Target} > \text{Center800 g } \textit{diff})$$

$$Z = \min\left[\textit{Diffsum} * \frac{\text{Target}}{\text{Center800 g } \textit{diff}},\right.$$

$$\left.\textit{Diffsum} + (\text{Target} - \text{Center800 g } \textit{diff})\right]$$

else $$Z = \textit{Diffsum} * \frac{\text{Target}}{\text{Center800 g } \textit{diff}}$$

("Z": a value of a corresponding point after the calibration, "Diffsum": the capacitance change amount detected at the corresponding point before the calibration, "Target": a target value, "Center800 g diff": the capacitance change amount detected at a center point (a point located at the center of the touch sensor panel) before the calibration).

16. A sensitivity compensation method of a touch input device sensing a touch pressure, the sensitivity compensation method comprising:

detecting a capacitance change amount according to a pressure which is applied to the touch input device; and calibrating the detected capacitance change amount by the following equation, $$\text{if}(\text{Target} > \text{Center800 g } \textit{diff})$$

$$Z = \min\left[\textit{Diffsum} * \frac{\text{Target}}{\text{Center800 g } \textit{diff}},\right.$$

$$\left.\textit{Diffsum} + (\text{Target} - \text{Center800 g } \textit{diff})\right] + \text{Offset}$$

else $$Z = \textit{Diffsum} * \frac{\text{Target}}{\text{Center800 g } \textit{diff}} + \text{Offset}$$

("Z": a value of a corresponding point after the calibration, "Diffsum": the capacitance change amount detected at the corresponding point before the calibration, "Target": a target value, "Center800 g diff": the capacitance change amount detected at a center point (a point located at the center of the touch sensor panel) before the calibration, Offset: offset).

17. A non-transitory computer readable recording medium recording a program which performs the sensitivity compensation method disclosed in claim 1.

* * * * *